(12) United States Patent
Yuasa et al.

(10) Patent No.: US 11,393,002 B2
(45) Date of Patent: Jul. 19, 2022

(54) TRANSACTION SYSTEM, METHOD, AND MEDIUM

(71) Applicant: HITACHI, LTD., Tokyo (JP)

(72) Inventors: Naohiro Yuasa, Tokyo (JP); Takashi Fukumoto, Tokyo (JP); Shinichi Kawamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 155 days.

(21) Appl. No.: 15/716,860

(22) Filed: Sep. 27, 2017

(65) Prior Publication Data

US 2018/0218418 A1    Aug. 2, 2018

(51) Int. Cl.
  *G06Q 30/06* (2012.01)

(52) U.S. Cl.
  CPC ................. *G06Q 30/0605* (2013.01)

(58) Field of Classification Search
  CPC .................................. G06Q 30/0605
  USPC ...................................... 705/26–27
  See application file for complete search history.

(56) References Cited

U.S. PATENT DOCUMENTS

| | | | | |
|---|---|---|---|---|
| 6,459,497 | B1 * | 10/2002 | Kashiwazaki | G06F 3/122 358/1.14 |
| 7,216,292 | B1 * | 5/2007 | Snapper | G06F 40/174 715/236 |
| 9,092,447 | B1 * | 7/2015 | Anderson | G07F 7/04 |
| 2013/0253967 | A1 * | 9/2013 | Single | G06Q 30/06 705/7.11 |
| 2015/0348031 | A1 * | 12/2015 | Sh. Al-Rashidi | G06Q 20/027 705/64 |
| 2016/0065417 | A1 * | 3/2016 | Sapuram | H04L 47/70 709/223 |

FOREIGN PATENT DOCUMENTS

| | | | |
|---|---|---|---|
| JP | 2001-319093 A | 11/2001 | |
| JP | 2013-045264 A | 3/2013 | |
| WO | WO-0025242 A1 * | 5/2000 | ............. G06Q 30/06 |

OTHER PUBLICATIONS

Al Kiswani, J.,Hasan Ahmed. (2019). Smart-cloud: A framework for cloud native applications development (Order No. 13426755). Available from ProQuest Dissertations and Theses Professional. (Year: 2019).*
Japanese Office Action dated Jan. 14, 2020 for the Japanese Patent Application No. 2016-213424.

* cited by examiner

*Primary Examiner* — Matthew E Zimmerman
*Assistant Examiner* — Latasha D Ramphal
(74) *Attorney, Agent, or Firm* — Volpe Koenig

(57) ABSTRACT

Provided is a transaction system that supports a transaction between a plurality of consumers and a plurality of suppliers, the transaction system including a server computer that is connected to a network, in which a plurality of consumer-side computers of the transaction and a plurality of supplier-side computers of the transaction are connected to the network, in which the server computer includes a processor that performs processing for interposing in a transaction performed between at least one of the plurality of consumer-side computers and at least one of the plurality of supplier-side computers, and a memory that records consumer-side information regarding the transaction which is output from each of the plurality of consumer-side computers and supplier-side information regarding the transaction which is output from each of the plurality of supplier-side computers.

10 Claims, 20 Drawing Sheets

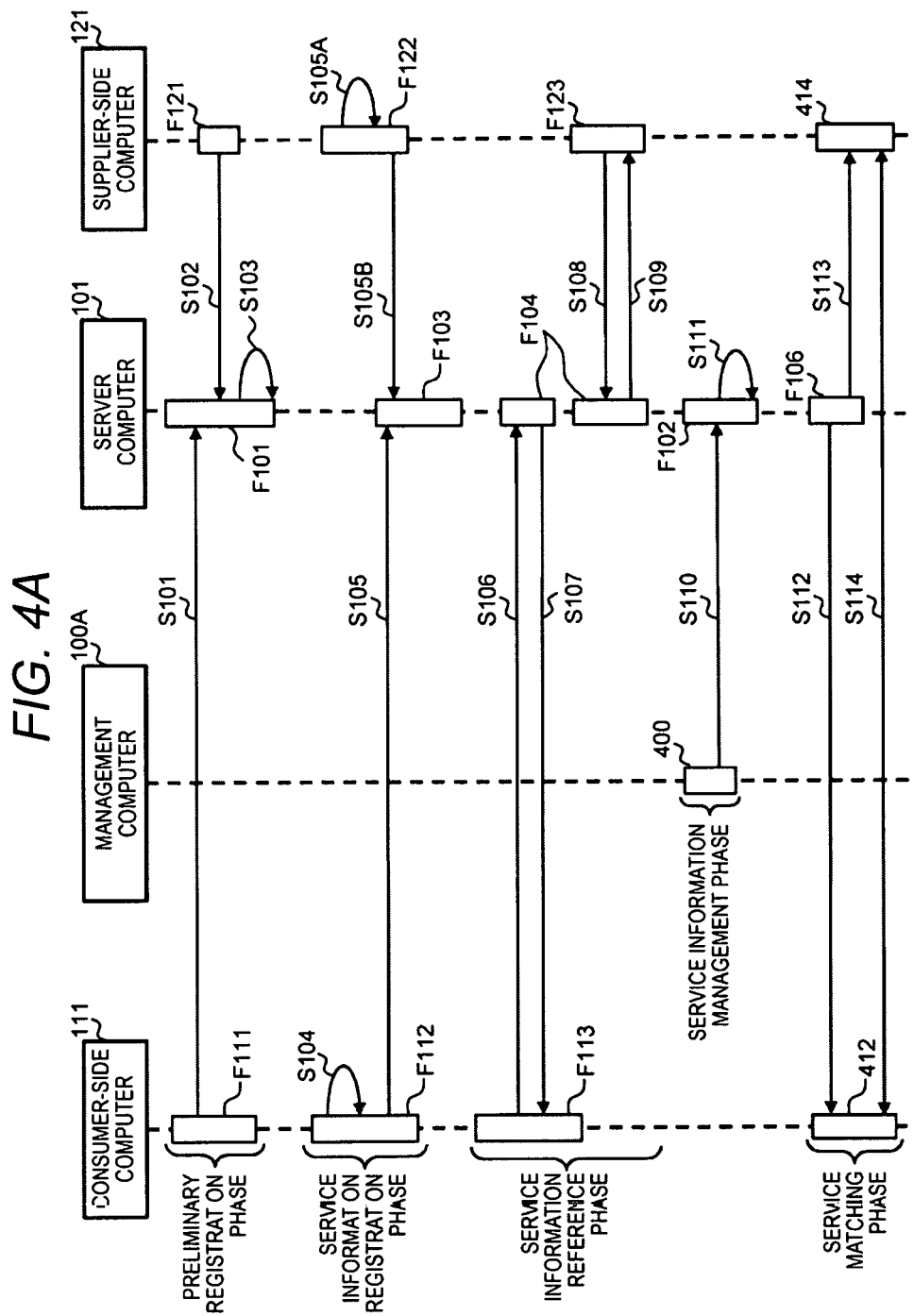

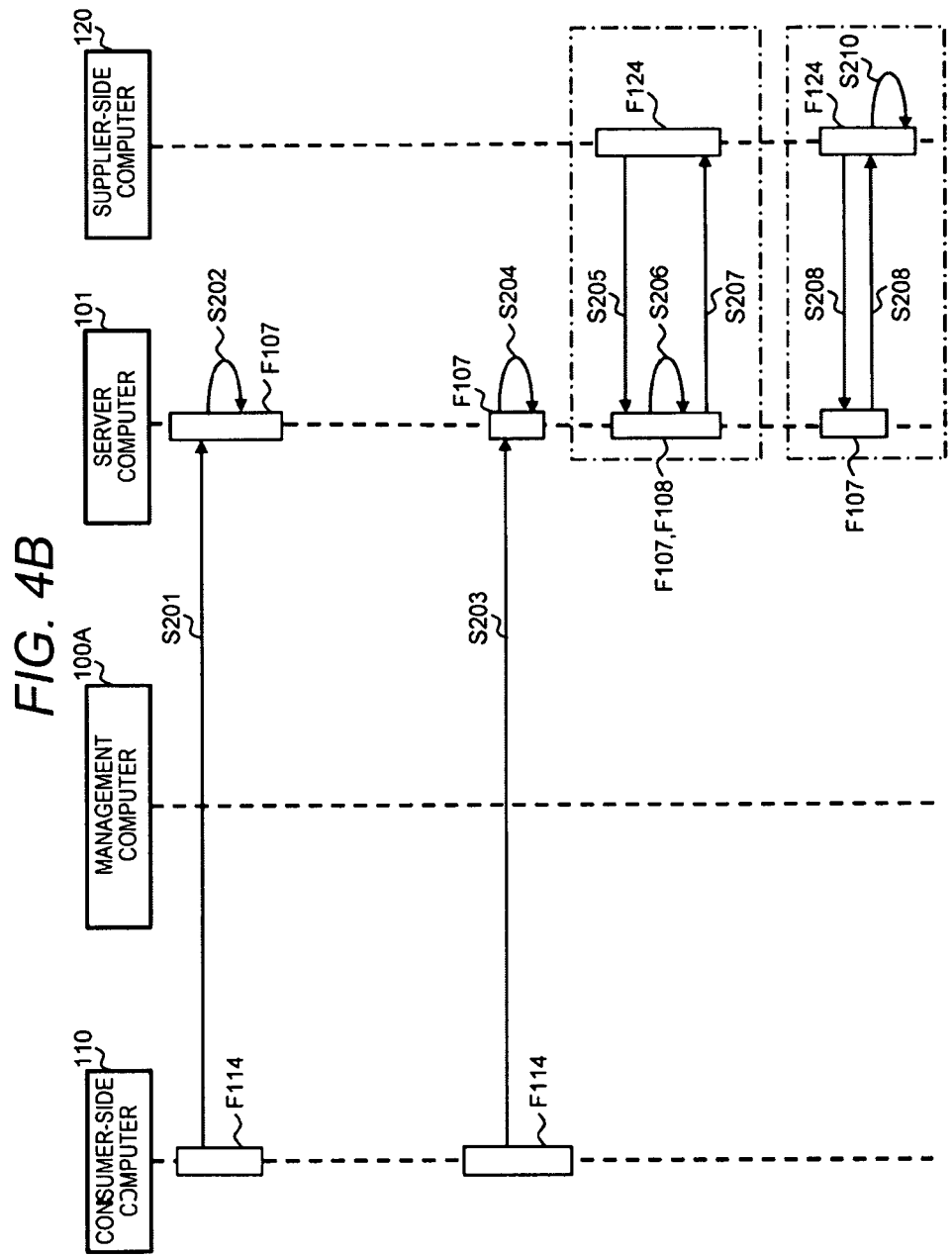

| | 601 | 602 | 603 | 604 | 605 | 606 | 607 |
|---|---|---|---|---|---|---|---|
| | ID | SERVICE NAME | SERVICE SUPPLIER NAME | PRICE | SUPPLY TIME | SUPPLY PLACE | VALUE |
| | 1 | ROUTINE MAINTENANCE OF COMPRESSOR ABCDEF10 | P_ID1000 MAINTENANCE MECHANIC A | ¥ 100,000/ ONCE | 16.3.10— 16.3.12 | CUSTOMER SITE | ONE CASE |

6B

| | 610 | 611 | 612 | 613 |
|---|---|---|---|---|
| | ID | SERVICE SUPPLY_ID | ADDITIONAL ITEM NAME | VALUE |
| | 1 | 1 | RATE OF OPERATION AFTER MAINTENANCE | 99.83 |
| | 2 | 1 | MAINTENANCE METHOD | MAINTENANCE BASED ON DISASSEMBLING AND DISJOINTING |

[EXECUTE] 608

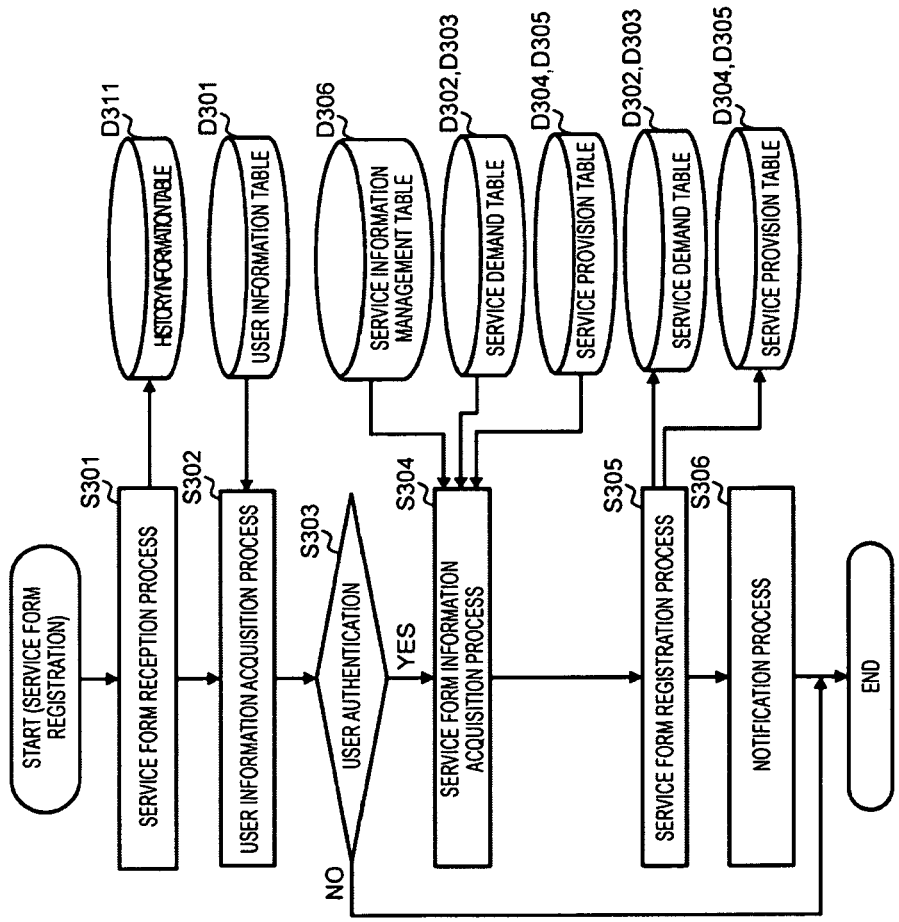

FIG. 8

| ID | SERVICE USER 501 | SERVICE DEMAND NAME 502 | DESIRED PRICE 503 | USE TIME 504 | DEMAND PLACE 505 | VALUE 506 |
|---|---|---|---|---|---|---|
| 1 | U_ID9000 CONSTRUCTION BUSINESS OPERATOR A | SUPPLY OF POWER | ¥43/kWh | 16.3.10.14:00— 16.3.10.14:30 | FACTORY A | 100kWh |
| 2 | U_ID7002 THERMAL POWER BUSINESS OPERATOR B | CLEANING WORK OF BOILER | ¥ 2,200,000/ONCE | 16.5.30—16.6.30 | | |
| 3 | U_IDZYXX WATERWORK BUSINESS OPERATOR C | READING WORK | ¥ 50/CASE | 17.4.1—18.3.30 | | |
| 4 | U_IDDDDD BUILDING OFFICE MANAGEMENT BUSINESS D | TROUBLE MAINTENANCE | ¥ 30,000/ONCE | 16.6.10_10:00— 16.7.10_17:00 | | |
| 5 | U_ID8239 TO JR USING TOURIST E | TOKYO SIGHTSEEING ADDED TOUR | ¥ 8,000/ONCE/ PERSON | 16.3.10_10:00— 16.3.10_12:00 | | |
| 6 | U_IDZZZZ XXX CITY HALL F | NOTIFICATION SYSTEM IN CASE OF DISASTER | ¥ 100/ONCE/ PERSON | -16.2.13 | | |
| 7 | U_IDLLLL PARTS MANUFACTURING FACTORY G | MODEL NUMBER AAAYY IRONWORK | ¥ 10,000/LOT (1000 PIECES) | -16.3.10 | | |
| ... | | | | | | |

| ID 610 | SERVICE DEMAND_ID 611 | ADDITIONAL ITEM NAME 612 | VALUE 613 |
|---|---|---|---|
| 1 | 1 | ENERGY TYPE | SOLAR POWER GENERATION |
| 2 | 2 | RATE OF OPERATION AFTER MAINTENANCE | 99.82 OR MORE |
| 3 | 2 | CLEANING PERIOD | 10 DAYS OR LESS |
| 4 | 2 | AMOUNT OF CLEANING | HIGH |
| 5 | 2 | APPLIED PERFORMANCE | 10 CASES OR MORE |
| 6 | 3 | READ DATA FORMAT | EXCEL FORMAT |
| 7 | 3 | NUMBER OF DAYS UNTIL PROVISION | 30 DAYS OR LESS (SINCE DAY OF READING) |
| 8 | 5 | TOUR LANGUAGE | FRENCH |
| 9 | 7 | UNIT OF LOT | 100 PIECES |
| 10 | ... | | |

| 601 | 602 | 603 | 604 | 605 | 606 | 607 |
|---|---|---|---|---|---|---|
| ID | SERVICE NAME | SERVICE SUPPLIER NAME | PRICE | SUPPLY TIME | SUPPLY PLACE | VALUE |
| 1 | ROUTINE MAINTENANCE OF COMPRESSOR ABCDEF10 | P_ID1000 MAINTENANCE MECHANIC A | ¥100,000/ONCE | 16.3.10— 16.3.12 | CUSTOMER SITE | ONE CASE |
| 2 | SUPPLY OF POWER | P_ID3002 POWER GENERATION COMPANY B | ¥43/kWh | 16.5.30— 16.6.30 | | 100kWh |
| 3 | MAINTENANCE CLEANING WORK OF BOILER D13234 | P_IDXXXX CLEANER C | ¥2,000,000/ ONCE | 17.4.1—18.3.30 | | |
| 4 | MAINTENANCE CLEANING WORK OF BOILER D13234 | P_IDKKKK GENERAL MAINTENANCE MECHANIC D | ¥2,500,000/ ONCE | 17.4.1—18.3.30 | | |
| 5 | TOUR PLAN | P_IDYYYY TRAVEL AGENCY E | ¥30,000/ONCE | 16.3.10_10:00— 16.3.10_17:00 | | |
| 6 | LONG-DISTANCE BUS SERVICE | P_IDZZZZ BUS SERVICE COMPANY F | ¥8,000/ONCE/ PERSON | 16.3.10_10:00— 16.3.10_12:00 | | |
| 7 | HOTEL STAY PLAN | P_IDAAAA TOKYO xxxyyy HOTEL G | ¥10,000/ONCE/ PERSON | 16.3.10 | | |
| 8 | MANUFACTURE OF SPRING A1000 MODEL FOR SEDAN | P_IDBBBB PARTS MANUFACTURER H | ¥10,000/LOT (1000 PIECES) | 16.3.10— | | |

FIG. 11

| ID | SERVICE SUPPLY_ID | ADDITIONAL ITEM NAME | VALUE |
|---|---|---|---|
| 1 | 1 | RATE OF OPERATION AFTER MAINTENANCE | 99.83 |
| 2 | 1 | MAINTENANCE METHOD | MAINTENANCE BASED ON DISASSEMBLING AND DISJOINTING |
| 3 | 3 | CLEANING METHOD | BY CLEANING FACILITY XXX |
| 4 | 3 | CLEANING PERFORMANCE | 33 COMPANIES |
| 5 | 5 | RATE OF REPEATER | 1% |
| 6 | 6 | RATE OF OPERATION ON SCHEDULE | 87% |
| 7 | 7 | NUMBER OF ROOMS | 8 ROOMS |
| 8 | 7 | FEATURE | BATHHOUSE |

FIG. 13

| ID 401 | SERVICE_ID 402 | NUMBER OF TIMES OF REFERENCE 403 | PERFORMANCE 404 | DEGREE OF SUITABILITY 405 |
|---|---|---|---|---|
| 1 | R_1001 | 1000 | 829 | XXXX : 80<br>YYYY : 90 |
| 2 | P_1002 | 50 | 13 | |
| 3 | R_1003 | 4000 | 1329 | |

| ID | SERVICE_ID | DATA NAME | VALUE |
|----|------------|-----------|-------|
| 1 | 1 | FACILITY NAME | AIR CONDITIONING |
| 2 | 1 | CHANGE TIME PER 1°C | 20100710_101000-1230, 2.5 MINUTES |
| 3 | 1 | CHANGE TIME PER 1°C | 20150710_101000-1300, 3 MINUTES |
| 4 | 2 | VIBRATION | h hmmd d 100 |
| 5 | 2 | AIR TEMPERATURE | h hmmd d 32 DEGREES |

| ID | SERVICE_ID | NAME | VALUE |
|---|---|---|---|
| 1 | 1 | PERFORMANCE VALUE | 20160710_101000-1500, 5 MINUTES |
| 2 | 2 | NUMBER OF OUTLIERS DETECTED | 10 OR MORE |
| 3 | 2 | TROUBLE TIME | OCTOBER 10, 2014 |
| 4 | 3 | WASTED TIME | LESS THAN 32 MINUTES |

FIG. 19

| ID | SERVICE_ID | SERVICE EVALUATION | VALUE |
|---|---|---|---|
| 1 | 1 | EVALUATION NAME | PERFORMANCE DETERIORATION DIAGNOSIS |
| 2 | 1 | EVALUATION METHOD | LINEAR PREDICTION, DETERMINATION OF THRESHOLD VALUE |
| 3 | 2 | EVALUATION NAME | DETECTION OF OBNORMAL VALUE |
| 4 | 2 | EVALUATION METHOD | DETERMINATION OF THRESHOLD VALUE |

D308

TRANSACTION SYSTEM, METHOD, AND MEDIUM

BACKGROUND OF THE INVENTION

Field of the Invention

The present invention relates to a transaction system that mediates or supports a transaction between a consumer of a commodity or a service and a supplier thereof.

Background Art

In recent years, with the progress of a technique in IT or ICT, a transaction system using a computer has been often used in commercial transaction activity such as sales of a commodity or a service. For example, JP-A-2013-45264 discloses a transaction system that mediates Internet shopping on a Web site.

This system enables a procedure of sales and purchase of a commodity (cloud product) such as SaaS, responds to a questionnaire (Q&A) accompanying information regarding a SaaS commodity that a customer considers purchasing to thereby provide suitability diagnosis for making it possible to automatically know the degree to which a commodity is suitable for a customer's needs, and diagnoses the degree of suitability between the commodity and the customer on the basis of information regarding the questionnaire (Q&A) to thereby improve the efficiency of sales of the commodity by using a diagnosis result.

SUMMARY OF THE INVENTION

The system according to JP-A-2013-45264 premises a regular transaction like a transaction of a SaaS-type commodity or service between a consumer and a supplier. However, in recent years, an electronic commerce has reached even a service related to social infrastructure business such as a power generation plant or a railway system. In such a type of field, consumers mainly demand nonstandard services for which it cannot possibly be said that the services are regular, and it is difficult to cope with the nonstandard services in a transaction system of the related art which is targeted at a transaction of a fixed service or commodity. Consequently, an object of the invention is to provide a transaction system capable of realizing data processing for smoothly and properly processing a transaction even when the treatment of a transaction object such as a service is in a diversified condition.

According to an aspect of the present invention, there is provided a transaction system that supports a transaction between a plurality of consumers and a plurality of suppliers, the transaction system including a server computer that is connected to a network, in which a plurality of consumer-side computers of the transaction and a plurality of supplier-side computers of the transaction are connected to the network, in which the server computer includes a processor that performs processing for interposing in a transaction performed between at least one of the plurality of consumer-side computers and at least one of the plurality of supplier-side computers, and a memory that records consumer-side information regarding the transaction which is output from each of the plurality of consumer-side computers and supplier-side information regarding the transaction which is output from each of the plurality of supplier-side computers, in which the memory records a first data block including a basic element of a demand matter for the transaction and a second data block including an additional element of the demand matter as the consumer-side information, and records a third data block including a basic element of a provision matter for the transaction and a fourth data block including an additional element of the provision matter as the supplier-side information, and in which the processor enables each of the plurality of consumer-side computers to register the consumer-side information in the memory and to refer to the supplier-side information from the memory, and enables each of the plurality of supplier-side computers to register the supplier-side information in the memory and to refer to the consumer-side information from the memory.

According to the invention, it is possible to provide a transaction system capable of realizing data processing for smoothly and properly processing a transaction even when the treatment of a transaction object such as a service is in a diversified condition.

BRIEF DESCRIPTION OF THE DRAWINGS

FIG. 4A is a timing chart illustrating a procedure until a server computer performs matching processing.

FIG. 4B is a timing chart for preliminary evaluation of a supplier's service.

FIG. 6 illustrates a service form displayed on an output device of a supplier-side computer.

FIG. 7 is a flow chart of a service form registration module.

FIG. 8 illustrates an example of a structure of a service demand table.

FIG. 9 illustrates an example of a structure of a service demand (additional) table.

FIG. 10 illustrates an example of a structure of a service supply table.

FIG. 11 illustrates an example of a structure of a service supply (additional) table.

FIG. 13 illustrates an example of a structure of a service information management table.

FIG. 17 illustrates an example of a service evaluation data table.

FIG. 18 illustrates an example of a service evaluation index table.

FIG. 19 illustrates an example of a service evaluation method table.

DETAILED DESCRIPTION OF THE INVENTION

Figure 1:
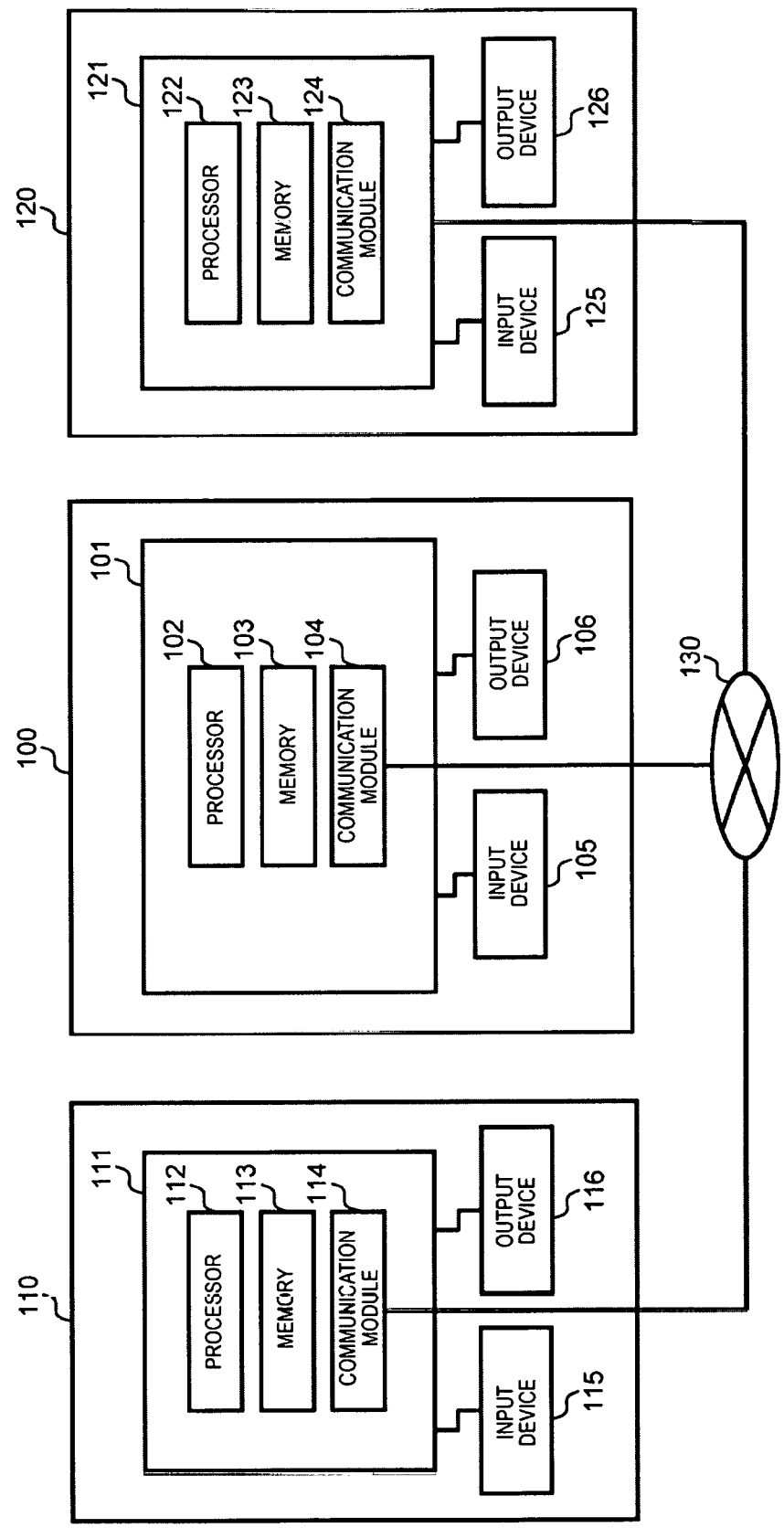
FIG. 1 is a block diagram illustrating hardware of a transaction system including a market place system.

Next, an embodiment of the invention will be described with reference to the accompanying drawings. FIG. 1 is a block diagram illustrating hardware of a transaction system including a market place system 100. The transaction system includes a consumer-side system 110 that transmits a demand related to a commodity or a service to a supplier side, and a supplier-side system 120 that transmits the provision of the commodity or the service to a consumer side. The consumer-side system 110 and the supplier-side system 120 are connected to the market place system 100 through a communication network 130. The consumer-side system 110 performs electronic processing regarding the processing of the demand, and the supplier-side system 120 performs electronic processing regarding the processing of the supply. Meanwhile, in the transaction system, a large number of consumer-side systems 110 and a large number of supplier-side systems 120 are connected to the communication network 130, and a one-to-one, many-to-one, one-to-many, or many-to-many commercial transaction is realized between a consumer and a supplier.

The commodity and the service may be collectively referred to as a "transaction object". The market place system 100 interposes in a transaction (a transaction between business operators) between the consumer-side system 110 and the supplier-side system 120 by mediating or supports the transaction. Each of the systems is constituted by a computer. The transaction includes transactions such as sales, rental, and the like of a commodity and a service (cloud product) such as SaaS, PaaS, or IaaS. The market place system 100 of the invention mediates and supports a transaction between a customer desiring a professional service, such as SaaS, which is unlikely to be a regular type, and a supplier capable of providing the service. In addition, the purposes of a transaction include sales, loan, use, and the like of a commodity, include a contract, ordering, and the like of a service, and are not particularly limited.

Examples of the professional service may include the maintenance, management, improvement, expansion, and the like of related facilities and functions of social infrastructure, such as a power station, a data center, a railway, and a plant, a large-scale air conditioning system, and the like, services provided by cooperation of a plurality of business operators such as sharing economy and a travel agency, and the like. In a transaction of the professional service, the type and contents of a consumer's desired service often become diversified and complicated, and the same is true of the type and contents of a service providable by a supplier. Therefore, a market place system capable of achieving mediation, that is, matching between the consumer and the supplier has a configuration and functions meeting such a request. Meanwhile, the "consumer" may be rephrased into a "demander" or a "user", or the "supplier" may be rephrased into a "provider".

As illustrated in FIG. 1, the market place system 100 includes a server computer 101. The server computer 101 includes a processor 102, a memory 103, and a communication module 104. The communication module 104 is connected to the communication network 130. An input device 105 such as a keyboard and an output device 106 such as a display are connected to the server computer 101.

A client computer 111 of the consumer-side system 110 is connected to the server computer 101 through the communication network 130. Similarly to the server computer 101, the client computer 111 includes a processor 112, a memory 113, and a communication module 114, and an input device 115 such as a keyboard and an output device 116 such as a display are connected to the client computer 111. A supplier-side computer 121 is also configured in the same manner as the consumer-side computer 111 (122 to 126). The consumer-side computer 111 and the supplier-side computer 121 communicate with the server computer 101 in accordance with a push system or a pull system.

The consumer-side system 110 registers information regarding a consumer's desired service in the market place system 100. The supplier-side system 120 registers information regarding a service providable by a supplier in the market place system 100. The market place system 100 executes various management processes including matching between the consumer's demand and the supplier's provision. The computers 111 and 121 of the consumer-side system 110 and the supplier-side system 120 may be personal computers, mobile terminals, or tablet terminals, and are not particularly limited.

The number of consumer-side systems 110 and the number of supplier-side systems 120 are not limited. A plurality of server computers 101 each constituting the market place system 100 may be present as measures against the trouble of hardware due to load distribution by distribution processing. In a mode in which the plurality of server computers 101 are present, the restriction (lock) of input and output access may be executed in order to maintain the consistency of data.

Figure 2:
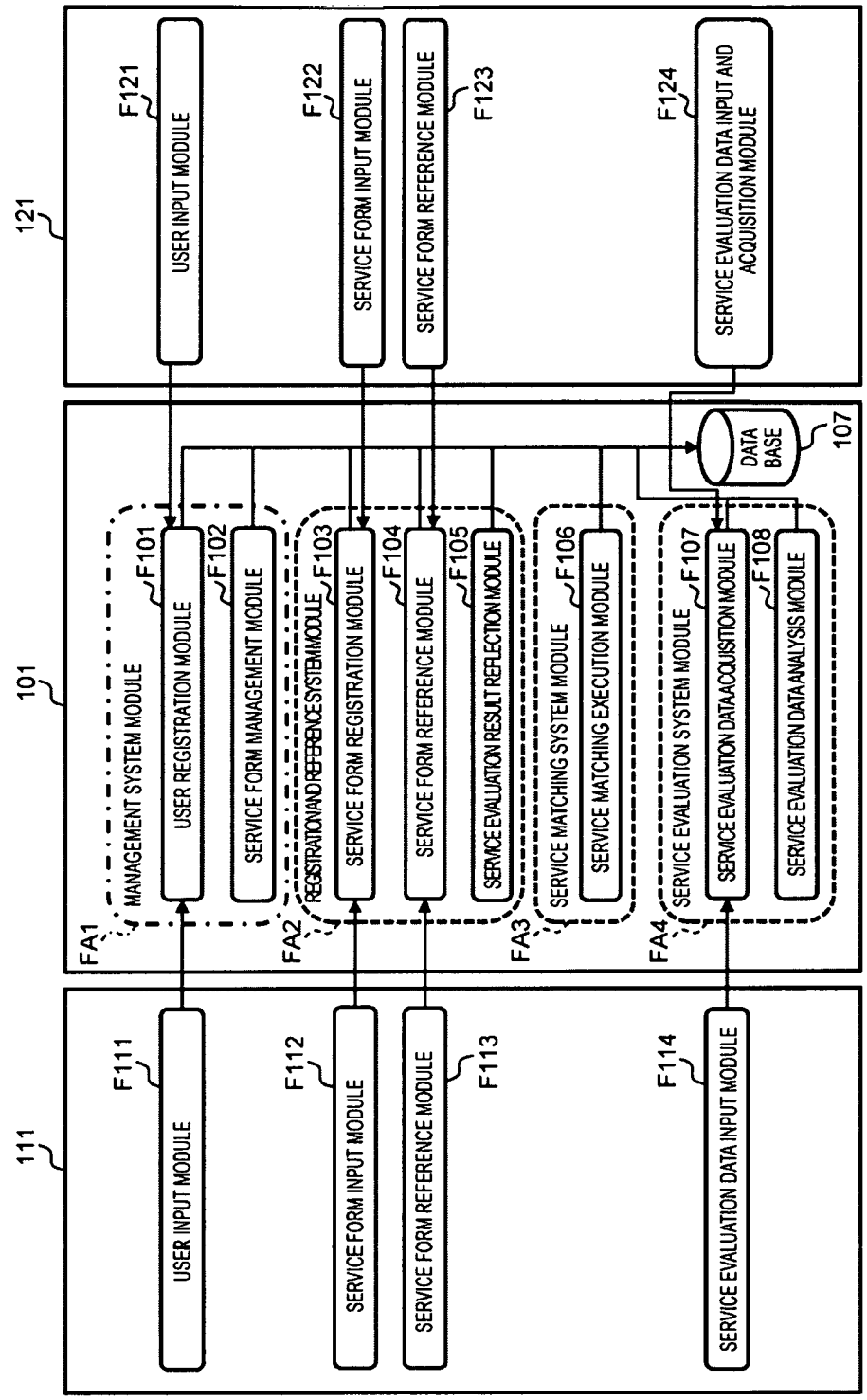
FIG. 2 is a functional block diagram of a transaction system (FIG. 1).

FIG. 2 illustrates a functional block diagram of the transaction system (FIG. 1). Functional modules illustrated in FIG. 2 are realized by the processor executing programs recorded in the memory. The server computer 101 of the market place system 100 includes a management system module FA1, a registration and reference system module FA2, a service matching system module FA3, and a service evaluation system module FA4.

The management system module FA1 executes management for mediating a transaction between the consumer-side system 110 and the supplier-side system 120, and includes, for example, a user registration module F101 that registers users in the server computer 101. The users are a consumer, a supplier, and a manager of the market place system 100.

The management system module FA1 further includes a service form management module F102 that manages a service form. The service form is a form for registering information regarding the consumer's desired service or a service providable by the provider in the server computer 101.

User registration information and the service form are registered in a database 107. The user registration module F101 and the service form management module F102 have access to the database 107 as necessary. A user input module F111 of the consumer-side computer 111 and a user input module F121 of the supplier-side computer 121 have access to the user registration module F101 to perform user registration.

The registration and reference system module FA2 includes a service form registration module F103, a service form reference module F104, and a service evaluation result reflection module F105. The service form registration module F103 registers the service form having information input thereto in the database 107 of the server computer 101, the service form reference module F104 causes a user to refer to the registered service form of the database 107, and the service evaluation result reflection module F105 reflects an evaluation result for the provider's service on the database 107.

A service form input module F112 of the consumer-side computer 111 and a service form input module F122 of the supplier-side computer 121 have access to the service form registration module F103 to input service information to a service form. A service form reference module F113 of the consumer-side computer 111 and a service form reference module F123 of the supplier-side computer 121 have access to the service form reference module F103 to be capable of referring to the information of the service form.

The service matching system module FA3 realizes a service matching execution module F106 to determine whether or not conditions, requirements, standard, or the like of a service registered in the service form are mutually suitable between the consumer and the supplier. In a case where the determination result is affirmative, the service matching system module executes matching between the consumer's demanded service and a service providable by the supplier. The wording "mutually suitable" includes not only the complete conformity of the conditions of the service but also the substantial conformity thereof. The wording "execution of matching between the services" includes the support of establishment of a contract between the consumer and the supplier such as the notification of conformity between the consumer's demand and the supplier's demand by e-mail or the like to the consumer and the supplier. The service matching execution module F106 can specify the degree of suitability to refer to the degree of suitability when determining the necessity or propriety of matching between the consumer and the supplier.

The mode of the matching includes one-to-one, one-to-many, many-to-one, or many-to-many matching between the consumer and the provider. For example, in a case where the consumer's desired service is achieved by a combination of services of a plurality of suppliers, the market place system 100 performs one-to-many matching. It is possible to determine whether or not the consumer's desired service is achieved by a combination of services of a plurality of suppliers by the service matching execution module F106 referring to the past matching performance (service matching table (FIG. 3: D307)) on the basis of input information of the service form.

The service evaluation system module FA4 evaluates the provider's service before a transaction is established between the consumer and the supplier, and discloses an evaluation result to the consumer, so that the consumer can select an optimal supplier capable of providing a service suitable for the consumer's demanded service from among the plurality of suppliers.

In recent years, consumers' demands have been complicated and diversified with the expansion and progress of economy and technology with respect to services or commodities transacted between consumers and suppliers, and the consumers' demands have changed day by day. For example, in order to stably operate an air conditioning facility, an elevator facility, and the like in facilities such as a tower-type office building holding a large-scale air conditioning facility and the like, it has been necessary to predict (sign analysis) the lifespan or trouble of the facility or function from operation data of the facility and to previously calculate, for example, the level and predicted occurrence time of the trouble of the facility so as to prevent the operation of the facility from being stopped.

Consumers often request a service, such as sign analysis, which requires a high level of professionalism from external expert organizations. There is an attempt to select the most superior supplier in a case where a plurality of suppliers for a professional service appear. However, even when a computer system attempts to perform the selection by a fixed examination method such as a Q&A form, it is difficult to find out a service of a supplier which may satisfy a consumer's demand. The superiority or inferiority of the supplier's service is not known until the service is provided to the consumer in many cases.

Consequently, the service evaluation system module FA4 preliminarily simulates the supplier's service on the basis of information received from the consumer to inform the consumer of an analysis result. The consumer can preliminarily evaluate the supplier's service on the basis of the analysis result and then determine the supplier. The analysis of the service may be performed by the service evaluation system module FA4, or may be performed by the supplier.

The service evaluation system module FA4 includes a module F107 that acquires data (evaluation data) for evaluating the service, and a module F108 that analyzes the data. The evaluation data acquisition module F107 acquires data necessary for the evaluation of the service, for example, application data of the facility, and the like from the consumer-side computer 111, and acquires an evaluation method such as a calculation method and a calculation system for evaluating the service from the supplier-side computer 121, and an evaluation data analysis module F108 analyzes the service of the supplier on the basis of the acquired data. Alternatively, the evaluation data analysis module F108 may cause the supplier-side computer 121 to execute a service that the supplier attempts to provide, on the basis of the data of the consumer which is acquired by the evaluation data acquisition module F107.

A service evaluation data input module F114 of the consumer-side computer 111 and a service evaluation data input and acquisition module F124 of the supplier-side computer 121 have access to the service evaluation data acquisition module F107, and thus the service evaluation data acquisition module F107 can acquire data from the service evaluation data input module F113 and the service evaluation data input and acquisition module F124 and can cause the service evaluation data input and acquisition module F124 to acquire data from the service evaluation data input module F113.

Figure 3:
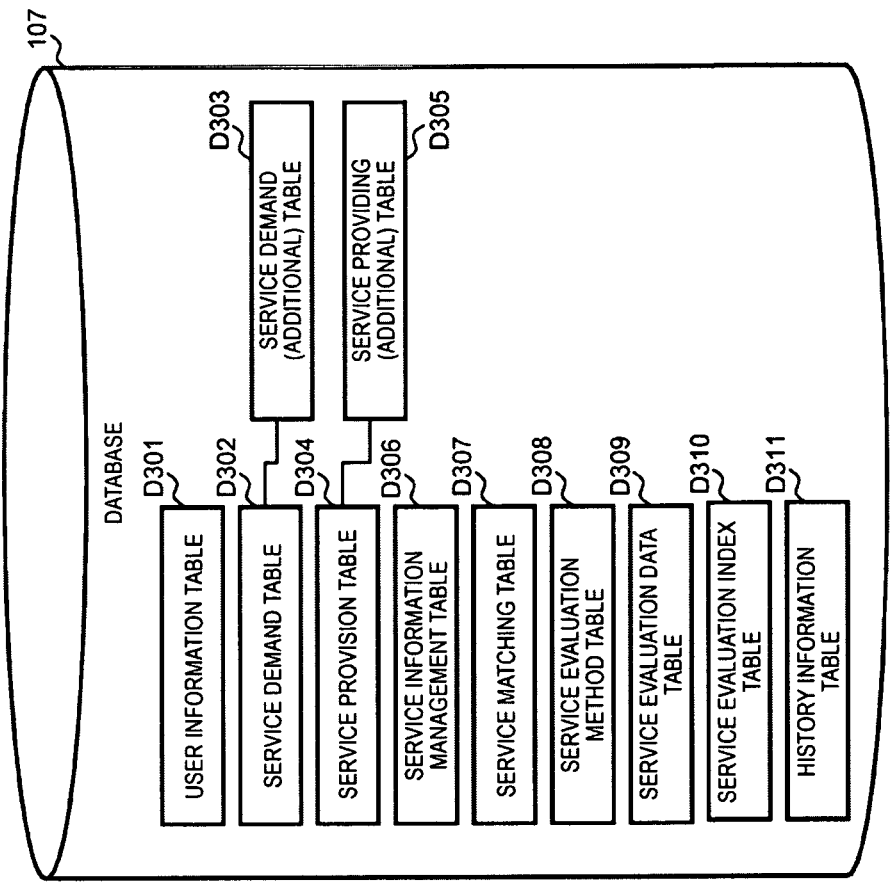
FIG. 3 illustrates an example of a block configuration of a database.

The database 107 of the server computer 101 continuously accumulates data handled by the module of the server computer 101. The database 107 is included in the memory 103. The database 107 may be included in an external storage system other than the server computer 101. FIG. 3 illustrates an example of a block configuration of the database. The database 107 includes a plurality of types of tables in accordance with a difference between functions of a plurality of modules.

A user information table D301 illustrated in FIG. 3 accumulates information of a user (a consumer, a supplier, or an operator of a market place system), a service demand table D302 accumulates a service form as service demand information, a service demand (additional) table D303, which is linked with the service demand table D302, accumulates an additional item of the service demand information, a service provision table D304 accumulates a service form as service provision information, and a service providing (additional) table D305, which is linked with the service provision table D304, accumulates an additional item of the service provision information.

A service information management table D306 holds service management information, a service matching table D307 holds information regarding matching, such as history information of service matching, a service evaluation method table D308 holds information of an evaluation method regarding service preliminary evaluation, a service evaluation data table D309 holds data for the service preliminary evaluation, a service evaluation index table D310 holds a service evaluation result, and a history information table D311 holds information of an access history of a service form. Each of the plurality of modules of the server computer 101 executes management, processing, or control based on each of the functions with reference to one or a plurality of tables of the database 107.

Next, a timing chart of the transaction system illustrated in FIG. 1 will be described. FIG. 4A is a timing chart illustrating a procedure until the server computer 101 performs matching processing, and FIG. 4B is a timing chart for preliminary evaluation of a supplier's service. The timing chart of FIG. 4A proceeds in order of a "preliminary registration phase", a "service information registration phase", a "service information reference phase", and a "service matching phase". Meanwhile, the plurality of computers constituting the transaction system may execute the plurality of phases in parallel.

In the preliminary registration phase, a user to participate in a market place is registered. The user includes a consumer (consumer-side computer 111) of a service and a provider (provider-side computer 121) of the service, as described above. An operation manager (management computer 100A) of the market place performs work equivalent to use rules or an application contract of a market place system, and the user registration module F101 acquires account information (ID, password) for having access to the market place system from the consumer-side system 110 in addition to a name, a company name, an address, a telephone number, an e-mail address, and the like which are information for specifying the consumer (S101), acquires information from the supplier-side system 120 (S102), and registers the pieces of information in the user information table D301 of the database 107 (S103). The user registration module F101 updates the consumer information table D301 when updating or deleting the registered information.

Figure 5:
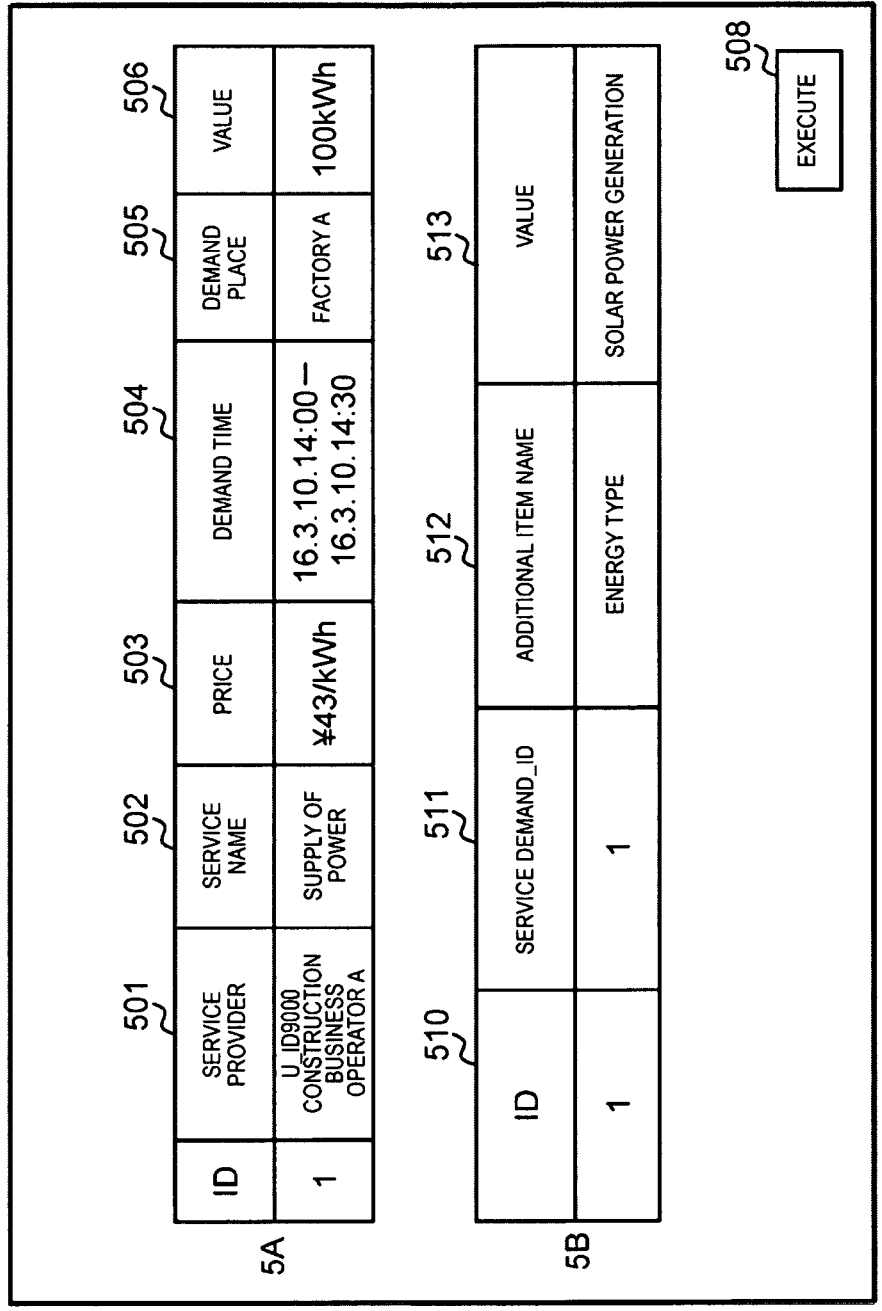
FIG. 5 illustrates an example of a service form displayed on an output device of a consumer-side computer.

Next, the service information registration phase will be described. Service information includes information of a consumer's demanded service and information of a service providable by a provider. FIG. 5 illustrates a service form (example of a data structure of a service form) which is displayed on the output device 116 of the consumer-side computer 111, 5A denotes a basic service form, and 5B denotes an additional service form. The service form input module F112 inputs service demand information to the service form (FIG. 4A: S104).

As illustrated in FIG. 5, for example, when it is assumed that a factory business operator A (501) of a service consumer ID "U_ID9000" demands to provide power necessary for the production of a product in a factory, the service form 5A includes items describing contents of a demanded service such as "when: Mar. 10, 2016" (504), "where: factory A" (505), "what: supply of power" (502), "what price: £43/kWh or less" (503), and "what amount: 100 kWh" (506).

The service form may be displayed on the output device 116 (FIG. 1) by the consumer-side computer 111 having access to the server computer 101 as a Web page or the like. When an "execute" icon 508 is selected, the service form input module F112 outputs information of the service form to the service form registration module F103 (S105). The service form registration module F103 registers the basic service form 5A in the service demand table D302, and registers the additional service form 5B in the service demand (additional) table D305.

The additional service form 5B is a service form for complementing the information of the service form 5A. For example, in a case where a consumer demands "solar power generation" as power necessary for the production of a product, the service form input module F112 may input "energy type" in an additional item name 512 of the additional service form 5B, and may input "solar power generation" in reference information 513. Reference numeral 510 denotes an entry of an additional item, and reference numeral 511 denotes an ID of a demand service. The additional service form 5B is linked with a service_ID_501 of the basic service form 5A by using a demand service ID_511 as an external key. A consumer's demand is divided into basic information (service form 5A) and additional information (additional service form 5B) which is more detailed or characteristic than the basic information, and thus the consumer's demand becomes clear.

FIG. 6 illustrates a service form which is displayed on the output device 126 of the supplier-side computer 121, 6A denotes a basic service form, and 6B denotes an additional service form. The service form input module F122 inputs service supply information to the service form (FIG. 4A: S105A). The service form 6A includes, for example, items (601 to 607) illustrated in FIG. 6. The service form 5B also includes, for example, items (610 to 613) illustrated in FIG. 6.

The service form may be displayed as a Web page or the like. When an "execute" icon 608 is selected, the service form input module F122 outputs information of the service form to the service form registration module F103 (S105B). The service form registration module F103 registers the basic service form 6A in the service provision table D304, and registers the additional service form 6B in the service demand (additional) table D303.

When the server computer 101 receives a request regarding the service form from the consumer-side computer 111 or the supplier-side computer 121, the server computer branches the processing of the service form registration module (F103) or the processing of the service form reference module (F104) on the basis of data corresponding to "registration processing" or "reference processing" included in a message.

FIG. 7 illustrates a flow chart of the service form registration module F103. The service form registration module F103 performs a process of receiving a request of a service form from a user (the consumer-side computer 111 or the supplier-side computer 121) (S301). In S301, the service form registration module F103 registers a log of a request in the history information table D311 as history information in order to manage a load of the server computer 101.

Next, the service form registration module F103 executes a user information acquisition process (S302). In S302, a user ID is acquired from a received message, and user authentication is performed with reference to the user information table D301. When a result of the user authentication is affirmative (S303: Yes), the flow proceeds to a service form information acquisition process (S304).

In S304, the service form registration module F103 acquires and provides a service form, which is optimal for the user, as a service form for input. The stationery of the service form may be patterned in accordance with the contents, type, and the like of a service. A point rate of a service form for a consumer may be recorded in the service demand table D302. A service form for a supplier may be recorded in the service provision table D304.

The service form registration module F103 selects a service form suitable for the user and presents the selected service form to the consumer in accordance with, for example, the type of business of the user on the basis of registration information of a user ID with reference to the tables. At this time, the service form registration module F103 can give priority to, for example, a service form for which the number of times of presentation to the user is large. Management information such as the number of times is recorded in the service information management table D306. Meanwhile, the service form may be selected by the user. The service form registration module F103 provides an additional table in accordance with the user's request.

Subsequently, the service form registration module F103 proceeds to a process (S305) of registering information of the service form. In S305, the service form registration module F103 registers the input service form (FIG. 5) from the consumer-side system 110 in the service demand tables D302 and D303. On the other hand, the service form registration module F103 registers the input service form (FIG. 6) from the supplier-side system 120 in the service provision tables D304 and D305.

Subsequently, the service form registration module F103 notifies the consumer-side computer 111 or the supplier-side computer 121 of a result to the effect that the registration has been completed or the registration is not successful, as a Web page (S306). When the service form registration module F103 fails in user authentication in S303, the flow chart is terminated by skipping S304 to S306. The service form registration module F103 informs the user of the failure in the user authentication, waits for a response from a user computer, and operates the user registration module F102.

FIG. 8 illustrates an example of the structure of the service demand table D302. The structure of the table corresponds to the service form 5A (FIG. 5). In the structure of the table, a service user (501), a service demand name (502), a desired price (503), a use time (504), a demand place (505), and a value (506) are associated with an ID of a service in each of a plurality of IDs of records. These items are just exemplified as items necessary for the specification of a service, and are not limited thereto.

FIG. 9 illustrates an example of the structure of the service demand (additional) table D303. The structure of the table corresponds to the service form 5B (FIG. 5). In the structure of the table, a service demand ID (611), an additional item name (612), and additional item-related information (value) (613) are associated with a service ID (610). These items are just exemplified as items necessary for the specification of a service, and are not limited thereto.

FIG. 10 illustrates an example of the structure of the service supply table D304. The structure of the table corresponds to the service form 6A (FIG. 6). In the structure of the table, a service name 602, a service supplier name 603, a price 604, a supply time 605, a supply place 606, and a value (the amount of supply) 607 are associated with a service ID 601. These items are just exemplified as items necessary for the specification of a service capable of being supplied, and are not limited thereto.

FIG. 11 illustrates an example of the structure of the service supply (additional) table D305. The structure of the table corresponds to the service form 6B (FIG. 6). In the structure of the table, a service supply_ID (611), an additional item name (612), and additional item-related information (value) (613) are associated with a service ID (610). These items are just exemplified as items necessary for the specification of a service, and are not limited thereto.

Subsequently, the service information reference phase (FIG. 4A) will be described. When the server computer 101 receives a request for acquiring service providing information from the service form reference module F113 (FIG. 2) of the consumer-side computer 111 at any timing (S106), the service form reference module F104 of the server computer 101 retrieves the service provision table D304 and the service providing (additional) table D305 by using service information (service ID) as a retrieval key, and transmits a service form corresponding or similar to the value of the retrieval key to the service form reference module F113 as a retrieval result (S107). Thereby, a consumer can confirm whether or not a service suitable for the demanded service has been provided.

When the service form reference module F104 receives a request for acquiring service demand information from the service form reference module F123 (FIG. 2) of the supplier-side computer 121 at any timing (S108), the service form reference module F104 retrieves the service demand table D302 and the service demand (additional) table D303 by using service information as a retrieval key, retrieves, for example, a service form corresponding to or similar to the value of the retrieval key, and transmits a retrieval result to the service form reference module F123 (S109). Thereby, the supplier-side computer 121 can confirm whether or not a service suitable for a service to be provided has been demanded.

Figure 12:
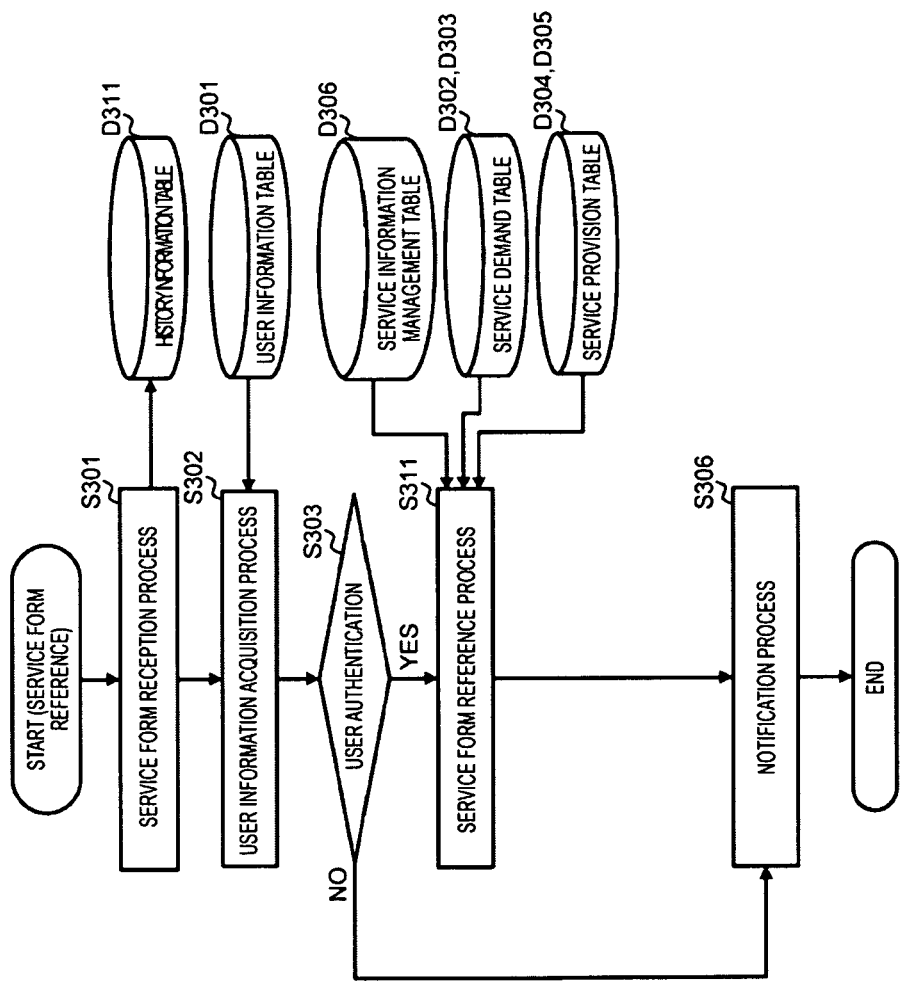
FIG. 12 is a flow chart of a service form reference module.

FIG. 12 illustrates a flow chart of the service form reference module F104. The service form reference module F104 receives a reference request of a service form from the service form reference module F113 or F213 (S301). In S301, the service form reference module F104 registers a log of a request in the history information table D311 as history information in order to manage a load of the server computer 101.

Next, the service form reference module F104 performs a user information acquisition process (S302) and then performs user authentication (S303). These processes are the same as those in the description of the flowchart illustrated in FIG. 7. The service form reference module F104 refers to the service form in S311 as described above (S106 to S109). At this time, the service form reference module F104 can preferentially extract a service form for which the number of times of reference is large, a service form for which the number of times of performance is large (to be described later in FIG. 13), or a service form for which the degree of suitability is high, from among a plurality of service forms (forms for input) with respect to service forms having the same or similar service contents. Therefore, a user can refer to a service form, such as a service form that arouses an interest because of a large number of times of access thereto or a service form which is suitable by the user's service, in accordance with the order of precedence. The number of times of reference, the number of times of results, or the degree of suitability is an example of the degree of priority. The degree of priority refers to the degree of giving priority to processing with respect to a plurality of objects to be processed.

The service form management module F102 records management information such as the number of times of reference of a service form in the service information management table D306 with reference to the history information table D311 in the service information management phase (FIG. 4A). The service form reference module F104 refers to the tables D301 to D305 for the reference of the service form.

Subsequently, the service form reference module F104 notifies the service form reference module F113 or F114 of the service form to be referred to, as a result of the user authentication (S306).

FIG. 13 illustrates an example of the structure of the service information management table D306. The service information management table D306 manages a service form, and specifically, manages a service form of a demand and a service form of provision together regardless of whether the service form is the service form of a demand or the service form of provision. Reference numeral 401 denotes an ID for identifying an entry of the table, and reference numeral 402 denotes a service_ID 401 (external key). In the service_ID, "R" indicates that a service form is a demand, and "P" indicates that a service form is provision. Reference numeral 403 denotes the number of times a service form is referred to, reference numeral 404 denotes the number of times (the number of times of performance) matching is made between a consumer and a supplier with respect to a certain service form, and reference numeral 405 denotes the degree to which a supplier of a service satisfies a demand of a consumer of the service, that is, the degree of suitability in preliminary evaluation of matching or the service. Meanwhile, the degree of suitability will be described later in detail.

The service form management module F102 executes a table optimization process in order to reduce a load of the server computer 101 and maintain the processing capability thereof in the service information management phase (FIG. 4) (S111). The table optimization process includes the deletion of repeated data or data for which the number of times of reference is small from the table, or the compression of the table. The service information management phase may be performed at a timing different from that of the above-described phase. A request S110 from the management computer 100A of the server computer 101 may lead to the execution of the optimization process. Thus, even when the amount of processing of data increases in the registration or reference of a service form, it is possible to achieve rapid processing of reference and registration of the service form, the amount of processing of an ICT resource, and a reduction in the amount of data accumulated.

Figure 14:
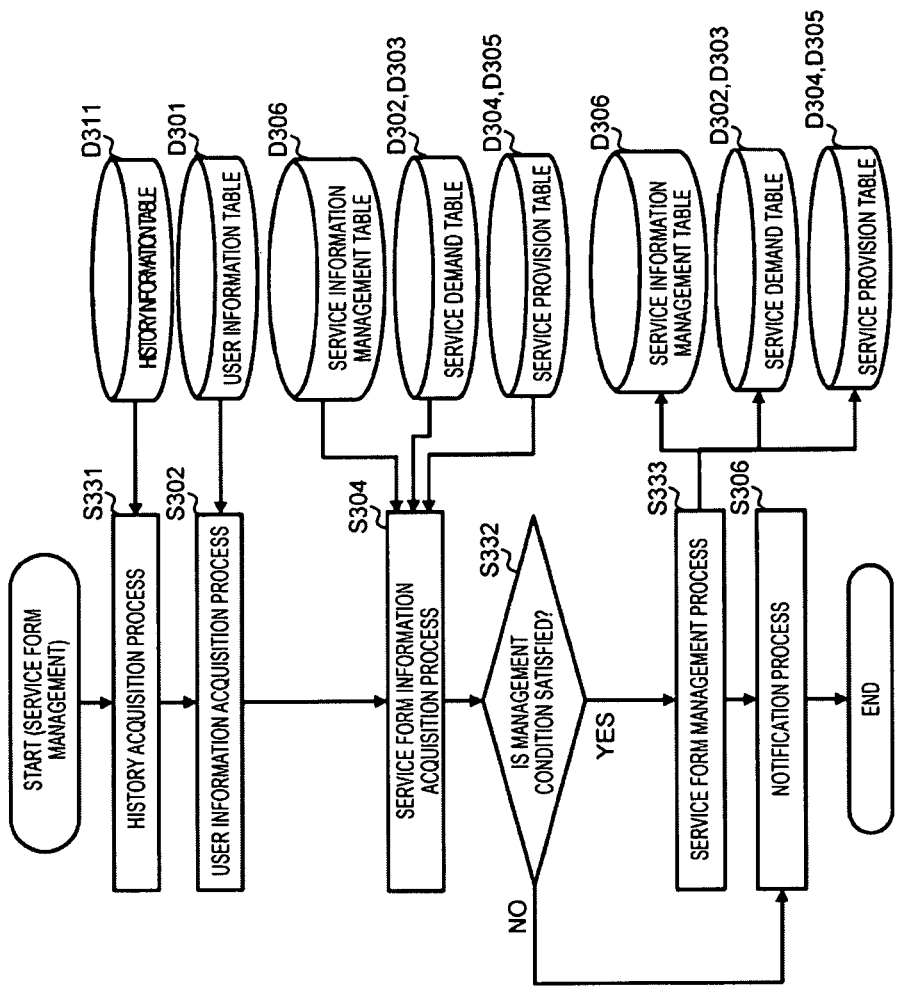
FIG. 14 illustrates an example of a flow chart of a service form management module.

FIG. 14 illustrates an example of a flow chart of the service form management module F102. The service form management module F102 reads history information from the history information table D311 (S331), and reads user information from the user information table D301 (S302). The reason in the latter case is because an optimization process is also performed on the user information table. The contents of S304 are the same as the description of the above-described flow chart.

The service form management module F102 determines whether or not information of the table satisfies management conditions in S332. For example, records of the service information management table D306 are scanned to extract a service ID from a record in which the number of times of reference within a fixed period of time after the registration of a service form in the table is equal to or less than a management value, a table having the service form registered therein is retrieved by using the service ID as a key, and a record belonging to the service ID is deleted from the table. In S306, the service form management module F102 notifies the management computer 100A (FIG. 4A) of a processing result of S332.

Figure 15:
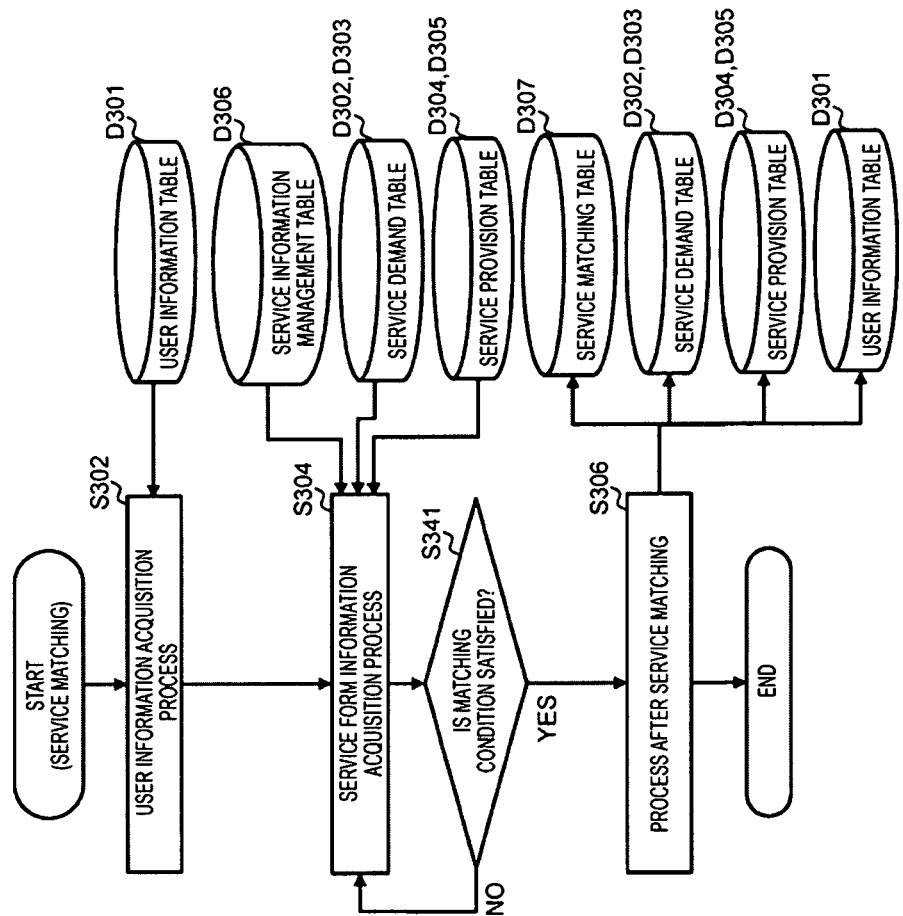
FIG. 15 illustrates an example of a flow chart of a service matching execution module.

FIG. 15 illustrates an example of a flow chart of the service matching execution module F106 (FIG. 2). The service matching execution module F106 acquires user information to be matched, with reference to the user information table D301 (S302). The service matching execution module F106 refers to the service information management table D306, the service demand tables D302 and D303, and the service provision tables D304 and D305 for matching (S304).

The service matching execution module F106 determines a matching condition for each service ID of the table (S341). For example, the service matching execution module F106 sequentially scans all service IDs of the service provision tables D304 and D305 for each service ID of the service demand tables D302 and D303 to extract a providable service being in conformity with the contents of a demand of a service. Here, the term "conformity" includes not only complete conformity therebetween but also partial conformity therebetween, as described above. For example, the service matching execution module F106 determines "conformity" in a range of the degree of suitability in a case where the degree of suitability (FIG. 13: 405) is set in a service ID which is an object for examination of matching, with reference to the service information management table D306. For example, when the degree of suitability is set to 80 percent, the service matching execution module F106 may match a service with a demanded service as long as the service is capable of satisfying 80 percent or more of the amount of demand of the service.

The consumer-side computer 111 can register the degree of suitability in the service demand table D302 or D303. The supplier-side computer 121 can also register the degree of suitability in the service provision table D304 or D305. The service form management module F102 registers the degree of suitability in the service information management table D306. In addition, for example, the service form management module F102 may set the degree of suitability from statistical information of performance of the past service matching in accordance with the type of service and the type of business of a user. Further, the service matching execution module F106 may perform service matching on the basis of results of preliminary evaluation (to be described later) of a service to be provided.

When the determination result of the service matching execution module F106 is affirmative in S341, the service matching execution module proceeds to S306 (processing after service matching) and records information of the service matching in the service matching table D307. The service matching table D307 records information regarding the service matching, such as a combination of a consumer-side service ID and a supplier-side service ID for establishing the service matching, a consumer-side user ID, a supplier-side user ID, the date on which the service matching is established, and the like.

The service matching execution module F106 records related information accompanied by the service matching in the service demand tables D302 and D303, the service provision tables D304 and D305, and the user information table D301.

The service matching execution module F106 notifies the consumer computer 111 which is a user for which the service matching has been performed of information (user information of a supplier, a service form of a supplier-side service, and the like) of a supplier-side service for which the service matching has been performed (FIG. 4A: S112). Further, the service matching execution module F106 notifies the supplier-side computer 121 of information (user information of a consumer, a service form of a consumer-side service, and the like) of a consumer-side service for which the service matching has been performed (S113). The consumer-side computer 111 and the supplier-side computer 121 which have received this notification can directly communicate with each other (S114) to promote agreement on a contract between the consumer and the supplier.

When the determination result of the service matching execution module F106 is negative in S341, a matching condition is determined with respect to the next service ID without performing service matching. Meanwhile, the service matching execution module F106 performs the procedure of the flow chart illustrated in FIG. 15 for each predetermined period of time. The establishment of the service matching is recorded in the service information management table D306 and the like, and thus the service matching execution module F106 may determine the necessity of establishment of the service matching with respect to only a service ID having no record of establishment of the service matching.

The supplier may input a service form in a manner of responding to the consumer's demand with reference to a service form created by the consumer. In this case, a service ID of the service form created by the consumer is linked with a service ID of a service form created by the supplier. On the other hand, the consumer may input a service form in a manner of responding to the supplier's offer with reference to the service form created by the supplier.

In this case, the service ID of the service form created by the supplier is linked with the service ID of the service form created by the consumer. The service matching execution module F106 may preferentially determine the necessity of matching between the consumer and the provider that form such a link therebetween.

The service matching execution module enables matching between the consumer and the supplier even when the consumer's request is diversified and complicated, unlike regular matching such as Q&A of the related art, in order to be capable of executing matching on the basis of the above-described service form and detailed description information of a service included in the table.

Next, preliminary evaluation of a supplier's service will be described. In a preferred mode of the transaction system, the server computer 101 performs preliminary evaluation and uses an evaluation result for the determination of necessity of matching between a consumer and a supplier. It is not obvious for the consumer which service is an optimal service if the supplier's service is not actually performed, even when the consumer knows a plurality of suppliers who can provide a service suitable for the consumer's desired service.

Consequently, the server computer 101 includes a system that preliminary verifies the supplier's service before a transaction between the consumer and the supplier is established. The server computer 101 requests data in a range in which preliminary verification can be performed from the consumer, but requests a method (a calculation method, a function, and the like) for verifying, evaluating, and analyzing a service from the supplier, simulates the supplier's service on the basis of the data and the method, and performs comparison between the service and the consumer-side demand to determine whether or not the supplier's service conforms to the demand.

The service evaluation data input module F114 (FIG. 2) of the consumer-side computer 111 inputs data for service evaluation to the service evaluation data acquisition module F107 of the server computer 101 (FIG. 4B: S203). The service evaluation data acquisition module F107 registers the data in the service form evaluation data table D309 (S204).

The data for service evaluation is data, such as operation data of an air conditioner, which is a basis of computation of performance deterioration of the air conditioner, for example, when it is assumed that a service is the determination of performance deterioration of the air conditioner.

The data for service evaluation includes a service evaluation index. The service evaluation index is data which is compared with an analysis result of the service and serves as a base for evaluating the analysis result of the service. The service evaluation index may be a computation result in the past actual example related to the performance deterioration of the air conditioner as in the above-described example, instead of being an analysis result created on the consumer side. The analysis result of the service is compared with the service evaluation index, and thus it can be understood that a service on the supplier side is a service conforming to the consumer's demand.

The service evaluation data input module F114 (FIG. 2) transmits service evaluation data to the service evaluation data acquisition module F107 of the server computer 101 (S203). The service evaluation data acquisition module F107 registers the service evaluation index in the service evaluation index table D310.

The service evaluation data input module F124 (FIG. 2) of the supplier-side computer 121 inputs the data for service evaluation to the service evaluation data acquisition module F107 of the server computer 101 (S205). The data for service evaluation includes a service evaluation method (a computation method and the like). The service evaluation data analysis module F108 of the server computer 101 computationally calculates the above-described basis data on the basis of the evaluation method, and compares a computation result with the service evaluation index (S206).

A comparison result indicates whether or not the supplier's service is suitable for the consumer's demand. The service evaluation data analysis module F108 outputs an evaluation result to the service evaluation data input module F124 of the supplier-side computer 121.

The service evaluation data acquisition module F107 registers the evaluation method in the service evaluation method table D308. The service evaluation data analysis module F108 registers a preliminary evaluation result in the service evaluation data table D309. The service evaluation system module FA4 outputs the evaluation result to the consumer-side computer F111.

The service matching execution module F106 may execute service matching when the preliminary evaluation result is suitable, with reference to the service evaluation data table D309. The service matching execution module F106 may perform preliminary evaluation on a supplier selected as an object to be matched on the basis of the designation of the supplier by the consumer, and may determine whether or not the matching can be performed in accordance with a result of the preliminary evaluation. Meanwhile, the above-described degree of suitability may be added to the determination of suitability.

Computation for the preliminary evaluation may be performed by the provider-side computer 121 instead of the service evaluation data analysis module F108. At this time, the service evaluation data acquisition module F107 provides data for analysis to the service evaluation data acquisition module F124 in accordance with a request of the service evaluation data acquisition module F124 (S208), but does not request the input of an evaluation method.

The service matching execution module F106 may perform the preliminary evaluation so as not to be included in requirements of matching. In this case, the service evaluation data analysis module F108 may execute the preliminary evaluation for a service of a matched supplier. The consumer may designate a supplier to perform preliminary evaluation.

The service evaluation system module FA4 may determine the necessity of preliminary evaluation on the basis of, for example, flag information recorded in a service form (demand and provision). A user can set the necessity of preliminary evaluation in the service form as a flag. When the service evaluation data acquisition module F107 confirms flags from both the consumer and the supplier with reference to the service form, the service evaluation data acquisition module requests the user computers 111 and 121 to input information necessary for the preliminary evaluation in order to perform the preliminary evaluation on a service ID for which a flag is set. The service evaluation data analysis module F108 may perform preliminary evaluation on a service ID for which the preliminary evaluation of a service is set on the basis of the service form, and then may execute matching on the service matching execution module F106 on the basis of a preliminary evaluation result.

Figure 16:
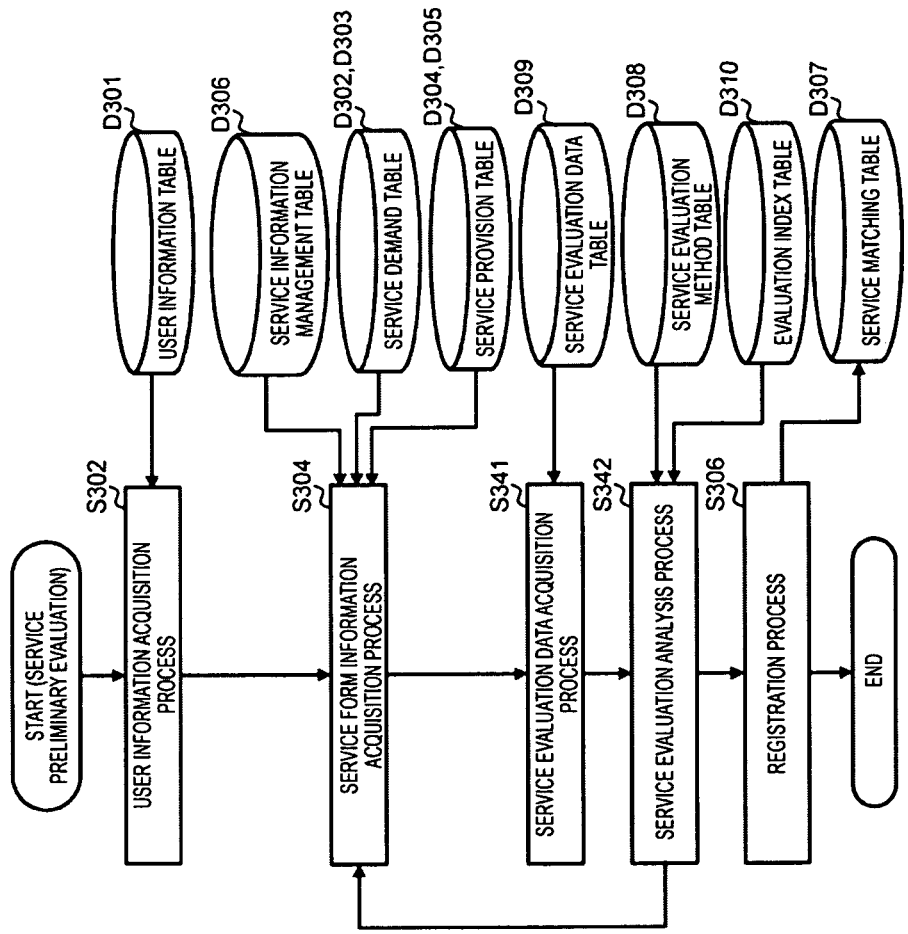
FIG. 16 illustrates an example of a flow chart of a service evaluation data analysis module.

Next, an example of a flow chart of the service evaluation data analysis module F108 will be described with reference to FIG. 16. The service evaluation data analysis module F108 executes a process of acquiring user information for user information to which preliminary evaluation is applied (S302). Subsequently, the service evaluation data analysis module F108 refers to the service demand tables D302 and D303 and the service provision tables D304 and D305 in order to confirm a service ID for which the preliminary evaluation of a service is necessary (S304). At this time, the service information management table D306 may be referred to in order to preferentially perform preliminary evaluation on a service ID for which the number of times of reference is large.

The service evaluation data analysis module F108 acquires evaluation data from the service evaluation data table D309 on the service ID for which the preliminary evaluation of a service is necessary (S341). Subsequently, the service evaluation data analysis module F108 takes up an evaluation method from the service evaluation method table D308, takes up a service evaluation index from the service evaluation index table D310, and performs preliminary evaluation analysis of the service on the service ID for which the preliminary evaluation of the service is necessary (S342).

The service evaluation data analysis module F108 also applies S304, S341, and S342 to another service ID for which the preliminary evaluation of a service is necessary. When the service evaluation data analysis module F108 terminates S342, the service evaluation result reflection module (FIG. 2: F105) may be caused to register the preliminary evaluation of the service in the service matching table D307 in S306, and the service matching execution module F106 may be caused to use the preliminary evaluation of the service.

Next, the preliminary evaluation of a service will be specifically described by taking the determination evaluation of performance deterioration of an air conditioner as an example. FIG. 17 illustrates an example of the service evaluation data table D309. Service evaluation data is specified by a data name and a data value for each service ID. Further, FIG. 18 illustrates an example of the service evaluation index table D310. A service evaluation index is specified by an index name and an index value for each service ID. Further, FIG. 19 illustrates an example of the service evaluation method table D308. A service evaluation method is specified by a service evaluation name and an evaluation method for each service ID. Services are associated with each other by a service ID (external key) between these tables.

With respect to a service having a service ID of "1", "data name: change time per 1° C.", "value: 20100710_101000-1230, 2.5 minutes", and "value: 20150710_1010-1300, 3 minutes" are recorded as service evaluation data. Meanwhile, this data represents a time until an actual target temperature is set after a temperature changing operation (charge for 1° C.) of an air conditioner is performed. The data may include a model number of a facility, a unit of data, and the like.

The determination of performance deterioration of the air conditioner relates to processing regarding how much the air conditioner has performance due to secular deterioration on the basis of an effect obtained by inputting a fixed amount of energy to the air conditioner at a certain point in time. A supplier of a service acquires service evaluation data, and registers a method of evaluating the service of the supplier in the service evaluation method table D308. Regarding the service evaluation name, linear prediction or the determination of a threshold value are performed as an evaluation method by the diagnosis of performance deterioration. An algorithm of specific calculation processing and a functional formula are collectively registered.

The service evaluation data analysis module F108 performs computation regarding what degree of accuracy or worth the supplier's service has. A computation result is compared with the service evaluation index. For example, when the computation result is "value: 20160710_101000-1430, 4.5 minutes" and a service evaluation index of the corresponding service ID is "name: performance value" and "value: 20160710_101000-1500, 5 minutes" (FIG. 6: service ID "1"), 0.5 minutes (5 minutes−4.5 minutes) which is a difference between both the values is calculated. The service evaluation data analysis module F108 may determine propriety for a consumer's demand of the supplier's service on the basis of an evaluation result by taking the degree of suitability into account. For example, when the degree of suitability is 90 percent, the difference of 0.5 minutes is equal to or less than 10 percent of 5 minutes of the evaluation index, a preliminary evaluation result is suitable.

The server computer 101 may set suitability in preliminary evaluation as a requirement of service matching, and the server computer 101 may perform the preliminary evaluation by the consumer-side computer 111 responding to a demand of the server computer 101 or the supplier-side computer 121 between a consumer and the supplier which are candidates of the service matching. The preliminary evaluation may be performed by the supplier-side computer 121 as described above. The service evaluation index may be the past analysis result owned by the consumer. The service evaluation index may be set by the server computer 101 being based on the past data. The preliminary evaluation does not necessarily require an evaluation index. In this case, as a result of evaluation, the server computer 101 may output "4.5 minutes" an evaluation result in a case of the above-described example. Meanwhile, the description of the above-described embodiment is just an example, and does not limit the invention.

What is claimed is:

1. A transaction system, for improving processing efficiency and reduction in data accumulation, between a plurality of computers, in which a plurality of consumer-side computers, a plurality of supplier-side computers, and a market place system are connected to a network, the market place system mediating Electric Power Energy transaction under a SaaS-type transaction between a consumer and a supplier, the transaction system comprising:

a management computer for the market place system, the management computer being connected to the network; and a server computer for the market place system, the server computer being connected to the network, includes:

a processor that performs processing for interposing in a transaction performed between at least one of the plurality of consumer-side computers and at least one of the plurality of supplier-side computers; and a memory that records consumer-side information regarding the transaction which is output from each of the plurality of consumer-side computers and supplier-side information regarding the transaction which is output from each of the plurality of supplier-side computers, wherein the memory:

stores a first data block including a basic element of a demand matter for the transaction and a second data block including an additional element of the demand matter as the consumer-side information, and records a third data block including a basic element of a provision matter for the transaction and a fourth data block including an additional element of the provision matter as the supplier-side information, stores a plurality of service forms including information regarding a plurality of service IDs and service information, and stores a fifth data block including at least the plurality of service IDs and for each of the plurality of service IDs a corresponding value representing a number of times a service is referred with respect to each of the plurality of service IDs; and, wherein the processor:

registers the consumer-side information in the memory and refers to the supplier-side information from the memory, and registers the supplier-side information in the memory and refers to the consumer-side information from the memory;

receives a request from the managing management computer, executes a table optimization process based on the request, the table optimization processing including:

scans the fifth data block to identify one of the plurality of service IDs whose corresponding value is less than or equal to a predetermined value, searches and retrieves a table including the plurality of service forms via an access key, wherein the access key is the identified one of the plurality of service IDs, deletes a record of the identified one of the plurality of service IDs from the table, compares the demand matter for the transaction with the provision matter for the transaction on the basis of the consumer-side information and the supplier-side information by using the table, creating a comparison;

determines a transaction object for which the provision matter suitable for the demand matter is set;

sets at least one combination of the consumer and the supplier on the basis of the determined transaction object;

determines if a predetermined matching condition is satisfied for each of the at least one combination, for each of the at least one combination for which the predetermined matching condition is not satisfied:

conducts preliminary evaluation of the provision matter for the comparison before the transaction between the consumer and the supplier is established using a degree of suitability;

recognizes the preliminary evaluation as a simulation of the provision matter on the basis of data for the preliminary evaluation, which is provided from the consumer, and a method provided from the supplier for calculating the data;

determines the provision matter to determine the transaction object on the basis of a result of the simulation; and deletes at least one of, at a time different from a time during which an information reference process occurs, data in the memory that is repeated and data in the memory that is referenced by the processor a smaller number of times than a predetermined amount, and wherein the degree of suitability is a percentage of a satisfaction value of which one of the plurality of service IDs satisfies the demand matter of the consumer of the one of the plurality of service IDs.

2. The transaction system according to claim 1, wherein the processor sets a degree of priority on the basis of at least one of the consumer-side information and the supplier-side information, and compares the demand matter for the transaction and the provision matter for the transaction with each other in accordance with the degree of priority.

3. The transaction system according to claim 1, wherein the processor determines suitability of the provision matter for the demand matter within a range of the degree of suitability.

4. The transaction system according to claim 1, wherein the processor adapts a plurality of provision matters including the provision matter to the demand matter.

5. The transaction system according to claim 1, wherein the processor combines the provision matter suitable for the preliminary evaluation with the demand matter.

6. The transaction system according to claim 5, wherein the processor determines suitability within a range of the degree of suitability.

7. The transaction system according to claim 1, wherein the processor performs an information registration process by presenting an input form for information registration to a first computer attempting to register the consumer-side information in the memory among the plurality of consumer-side computers and a second computer attempting to register the supplier-side information in the memory among the plurality of supplier-side computers, and executes the presentation of the input form by extracting a predetermined input form in accordance with a degree of priority of each of the plurality of input forms for the information registration and presenting the predetermined input form.

8. The transaction system according to claim 1, wherein the processor registers the consumer-side information and the supplier-side information in the memory, creating registered information and then optimizes the registered information on the basis of degrees of priority of the registered information.

9. A method of controlling a transaction system, for improving processing efficiency and reduction in data accumulation between a plurality of computers, in which a plurality of consumer-side computers, a plurality of supplier-side computers, and a market place system are connected to a network, the market place system mediating Electric Power Energy transaction under a SaaS-type between a consumer and a supplier, the method comprising:

storing, via a memory in a server computer connected to the network, consumer-side information regarding a transaction which is output from each of the plurality of consumer-side computers and supplier-side information regarding the transaction which is output from each of the plurality of supplier-side computers, storing, via the memory, the consumer-side information to be a first data block including a basic element of a demand matter for the transaction and a second data block including an additional element of the demand matter, the supplier-side information to be a third data block including a basic element of a provision matter for the transaction and a fourth data block including an additional element of the provision matter, storing, via the memory, a plurality of service forms including information regarding a plurality of service IDs and service information, storing, via the memory, a fifth data block including at least the plurality of service IDs and for each of the plurality of service IDs a corresponding value representing a number of times a service is referred with respect to each of the plurality of service IDs, registering, via a processor of the server computer for the market place system, the server computer being connected to the network, the consumer-side information in the memory and referring to the supplier-side information from the memory, and registering the supplier-side information in the memory and referring to the consumer-side information from the memory, in order to interpose in the transaction performed between at least one of the plurality of consumer-side computers and at least one of the plurality of supplier-side computers, receiving, via the processor, a request from a managing computer, executing, via the processor, a table optimization process based on the request, the table optimization process including:

scanning, via the processor, the fifth data block to identify one of the plurality of service IDs whose corresponding value is less than or equal to a predetermined value, searching and retrieving, via the processor, a table including the plurality of service forms via an access key, wherein the access key is the identified one of the plurality of service IDs, deleting, via the processor, a record of the identified one of the plurality of service IDs from the table, comparing, via the processor, the demand matter for the transaction with the provision matter for the transaction on the basis of the consumer-side information and the supplier-side information by using the table, creating a comparison;

determining, via the processor, a transaction object for which the provision matter suitable for the demand matter is set;

setting, via the processor, at least one combination of the consumer and the supplier on the basis of the determined transaction object;

determining if a predetermined matching condition is satisfied for each of the at least one combination, for each of the at least one combination for which the predetermined matching condition is not satisfied:

conducting, via the processor, preliminary evaluation of the provision matter for the comparison before the transaction between the consumer and the supplier is established using a degree of suitability;

recognizing, via the processor, the preliminary evaluation as a simulation of the provision matter on the basis of data for the preliminary evaluation, which is provided from the consumer, and a method provided from the supplier for calculating the data;

determining, via the processor, the provision matter to determine the transaction object on the basis of a result of the simulation; and deleting at least one of, via the processor, at a time different from a time during which an information reference process occurs, data in the memory that is repeated and data in the memory that is referenced by the processor a smaller number of times than a predetermined amount, and wherein the degree of suitability is a percentage of a satisfaction value of which one of the plurality of service IDs satisfies the demand matter of the consumer of the one of the plurality of service IDs.

10. A non-transitory computer readable medium storing a program for controlling a transaction system, for improving processing efficiency and reduction in data accumulation, between a plurality of computers, in which a plurality of consumer-side computers, a plurality of supplier-side computers, and a market place system are connected to a network, the market place system mediating Electric Power Energy transaction under a SaaS-type transaction between a consumer and a supplier wherein the program, when executed by a processor, causes the processor of a server computer connected to a network for connecting the plurality of consumer-side computers and the plurality of supplier-side computers to each other to:

store consumer-side information regarding a transaction which is output from each of the plurality of consumer-side computers and supplier-side information regarding the transaction which is output from each of the plurality of supplier-side computers in a memory of the server computer;

store the consumer-side information to be a first data block including a basic element of a demand matter for the transaction and a second data block including an additional element of the demand matter;

store the supplier-side information to be a third data block including a basic element of a provision matter for the transaction and a fourth data block including an additional element of the provision matter;

store a plurality of service forms including information regarding a plurality of service IDs and service information;

store a fifth data block including at least the plurality of service IDs and for each of the plurality of service IDs a corresponding value representing a number of times a service is referred with respect to each of the plurality of service IDs;

register the consumer-side information in the memory and refer to the supplier-side information from the memory;

register the supplier-side information in the memory and refer to the consumer-side information from the memory, in order to interpose in the transaction performed between at least one of the plurality of consumer-side computers and at least one of the plurality of supplier-side computers;

receive a request from a managing computer; and execute a table optimization process based on the request, the table optimization processing including:

scan the fifth data block to identify one of the plurality of service IDs whose corresponding value is less than or equal to a predetermined value, searches and retrieve a table including the plurality of service forms via an access key, wherein the access key is the identified one of the plurality of service IDs, delete a record of the identified one of the plurality of service IDs from the table, compares the demand matter for the transaction with the provision matter for the transaction on the basis of the consumer-side information and the supplier-side information by using the table, creating a comparison, determines a transaction object for which the provision matter suitable for the demand matter is set, sets at least one combination of the consumer and the supplier on the basis of the determined transaction object, determines if a predetermined matching condition is satisfied for each of the at least one combination, for each of the at least one combination for which the predetermined matching condition is not satisfied:

conducts preliminary evaluation of the provision matter for the comparison before the transaction between the consumer and the supplier is established using a degree of suitability, recognizes the preliminary evaluation as a simulation of the provision matter on the basis of data for the preliminary evaluation, which is provided from the consumer, and a method provided from the supplier for calculating the data, determines the provision matter to determine the transaction object on the basis of a result of the simulation, and deletes at least one of, at a time different from a time during which an information reference process occurs, data in the memory that is repeated and data in the memory that is referenced by the processor a smaller number of times than a predetermined amount, and wherein the degree of suitability is a percentage of a satisfaction value of which one of the plurality of service IDs satisfies the demand matter of the consumer of the one of the plurality of service IDs.

* * * * *